United States Patent [19]

Weinbrecht

[11] Patent Number: 4,960,975
[45] Date of Patent: Oct. 2, 1990

[54] METHOD AND APPARATUS FOR OPERATING A SOLDERING STATION

[75] Inventor: Michael Weinbrecht, Wertheim, Fed. Rep. of Germany

[73] Assignee: ERSA Ernst Sachs KG GmbH & Co., Wertheim, Fed. Rep. of Germany

[21] Appl. No.: 336,727

[22] Filed: Apr. 12, 1989

[30] Foreign Application Priority Data

Apr. 12, 1988 [DE] Fed. Rep. of Germany ....... 3812139

[51] Int. Cl.⁵ .......................................... H05B 1/02
[52] U.S. Cl. .................................. 219/241; 219/85.22
[58] Field of Search .............. 219/241, 221, 227, 228, 219/229, 233, 240, 85.22

[56] References Cited

U.S. PATENT DOCUMENTS

| | | | |
|---|---|---|---|
| 3,699,306 | 10/1972 | Finch | 219/241 |
| 3,883,716 | 5/1975 | Fortune | 219/241 |
| 4,055,744 | 10/1977 | Fortune | 219/241 |
| 4,224,744 | 9/1980 | Siegel | 219/85.22 |
| 4,734,559 | 3/1988 | Fortune | 219/241 |
| 4,847,471 | 7/1989 | Wallgren | 219/501 |

Primary Examiner—Roy N. Envall, Jr.
Attorney, Agent, or Firm—Brooks Haidt Haffner & Delahunty

[57] ABSTRACT

A method is described for controlling the operating temperature of a soldering iron to a predetermined value, several temperature sensors being provided in the soldering iron distributed over the length of the soldering iron, the measured values of which are supplied to a computer which controls the heating element of the soldering iron.

By this method the temperature of the soldering tip, which is especially important for satisfactory operation, can be adjusted especially exactly, because the computer infers the temperature of the soldering tip from the measured temperatures via an appropriate program.

11 Claims, 4 Drawing Sheets

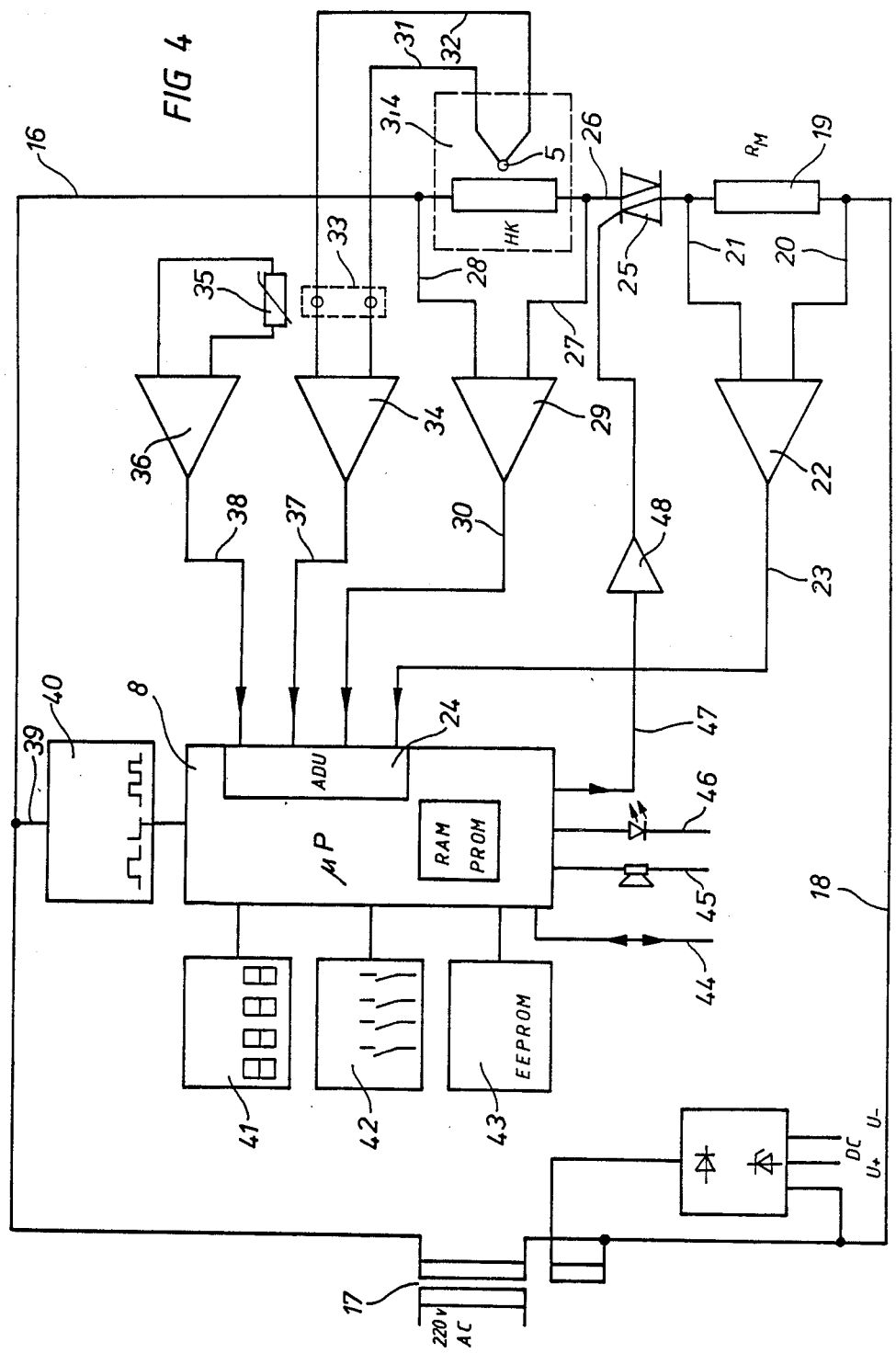

METHOD AND APPARATUS FOR OPERATING A SOLDERING STATION

BACKGROUND OF THE INVENTION

1. Field Of The Invention

The invention relates to a method for controlling the operating temperature of a soldering iron to a predetermined value with the aid of a temperature sensor arrangement contained in the soldering iron which, depending on the temperature measured, turns a heating element of the soldering iron on or off.

2. Description Of The Prior Art

In known methods of this kind the temperature sensor arrangement consists of a single temperature sensor disposed in the region of the heating element. By this method the temperature of the soldering iron in the region of the heating element can be measured and also regulated properly. But for satisfactory operation of the soldering iron it is more important to aim at the temperature of the soldering tip. It is, however, not possible for practical reasons to install a temperature sensor directly in the soldering tip, because the temperature sensor would considerably impede the required good heat transfer to the area being soldered.

It was therefore not possible until now to keep the temperature of the soldering tip constant independently of the heat flow emanating from the soldering tip. In particular it would happen that if there was much heat transfer from the soldering tip, the soldering tip temperature decreased so sharply that satisfactory soldering was no longer ensured.

It is, therefore, the object of the present invention to develop a method and an apparatus of the initially mentioned kind in such a way that, independently of the magnitude of the heat transfer from the soldering iron tip, the temperature of the soldering iron tip is always maintained constant.

For the solution of the problem there is proposed a method according to the invention which is characterized in that for stabilization of the temperature at the soldering tip independently of the hat flow from the soldering tip, the soldering tip body is conceived in its longitudinal extent as a controlled system on which several temperature sensors are arranged spaced from each other, and that the parameters picked up by the temperature sensors, such as temperature, rate of temperature change, temperature rise, are supplied to a computer which, via a mathematical model, determines the soldering tip temperature not measured and keeps it constant independently of the heat flow.

Thus it is an essential feature of the present invention that the soldering tip body is conceived as a controlled system in its longitudinal extent, on whose length several temperature sensors are arranged spaced from each other. Each temperature sensor (pick up) furnishes a measured quantity proportional to the temperature. The temperature sensors are located at points of different temperature level.

From the measured values the non-measurable temperature at the tip of the soldering iron is inferred by means of a mathematical model. To this end, quantities such as temperature, rate of temperature change, temperature rise and the like are evaluated.

For regulation there are used measured or calculated parameters, namely insofar as the system is controlled either to the tip temperature value calculated by the model or to other values determined from the measured quantities.

Thereby the essential advantage is achieved that now the actual soldering tip temperature can always be calculated in the computer independently of the particular load (heat transfer at the soldering tip) and accordingly the output of the heating element can be readjusted.

To establish an appropriate control model, actually any number of temperature sensors may be arranged spaced from each other along the soldering tip body. However, for measuring and circuitry reasons it is preferred to use as few temperature sensors as possible. For this there are several options, among which the use of two mutually independent temperature sensors is preferred.

To make the model of the controlled system used by the computer as accurate as possible, it is preferred to arrange the first sensor as close to the soldering tip as possible, but without impeding the heat transfer from the soldering tip.

In this connection it is preferred to design this sensor as a thermocouple, being that it has heretofore been possible only with thermocouples to arrange them near the tip so that on the one hand they do not adversely alter the tip geometry and on the other hand do not impede the heat transfer.

Suitable as material for a thermoelement has been found to be a Ni-Cr-Ni material. Now only one additional temperature sensor is needed, which is disposed spaced from the first temperature sensor, designed as thermocouple, in the direction of the heating element.

It is then preferred to use the heating element itself as temperature sensor, because thereby in turn the cost of circuitry is substantially reduced.

In fact, if according to the invention one uses as heating element a ceramic tube which is provided with an electroconductive, current-carrying coating, the type of coating can be chosen so that the coating acts as a PCT resistor. Thus, by measuring the voltage drop at the heating element and by measuring the current flow through the heating element, the effective resistance of the heating element can be determined, and therefrom the effective heating element temperature.

Use of a PCT material as heating element has the further advantage that with a cold heating element there is a very low electric resistance, so that a very rapid heating takes place, so that thereby also quick heat flow changes at the soldering tip can be compensated quickly.

The said measured values of these two temperatures sensors are supplied to the analog input of a digital computer, which internally processes these values via an analog/digital computer, which internally processes these values via an analog/digital converter and feeds them as measured quantities into its internally established computation program.

The computation program determines therefrom the soldering tip temperature not measured. For this purpose quantities such as temperature, rate of temperature change, temperature rise and so forth are evaluated.

Certain process data such as mode of operation, desired values, etc. can be entered via a keyboard or made visible via a display. Upon turnoff of the equipment, various parameters, e.g. desired values, can be stored in a non-volatile memory.

For determining the temperature in the soldering iron the following parameters are measured:

1. the voltage which the thermocouple delivers in the soldering iron,
2. a voltage proportional to the terminal point temperature, by means of a measuring resistor,
3. the voltage present at the heating element,
4. a voltage proportional to the heating element current, by means of a measuring resistor. (Rm)

These quantities are amplified and resolved in the A/D converter of the microprocessor with 8 or 9 bits. From the digital values thus obtained Hk and TH.e can be calculated and used for control in the above stated manner.

The soldering iron is operated on contactproof AC voltage. As power control element a semiconductor switch (Triac) is used. The power control element is switched on or off always in the zero crossing of the AC voltage. For synchronization the microprocessor is supplied a square signal whose edge falls with the zero crossing of the load voltage.

Communication with the microprocessor is possible via a serial interface.

The subject of the present invention results not only from the subject of the individual claims but also from the combination of the individual claims with one another. All data and features disclosed in the documents—including the summary—in particular the physical realization illustrated in the drawings are claimed as essential to the invention insofar as they individually or in combination are novel relative to the prior art.

BRIEF DESCRIPTION OF THE DRAWINGS

In the following, the invention will be explained more specifically with reference to drawings representing merely a form of realization. Additional features essential to the invention and advantages of the invention will be evident from the drawings.

FIG. 4, schematically, a block diagram of an embodiment of the invention.

DESCRIPTION OF THE PREFERRED EMBODIMENT

Figure 1:
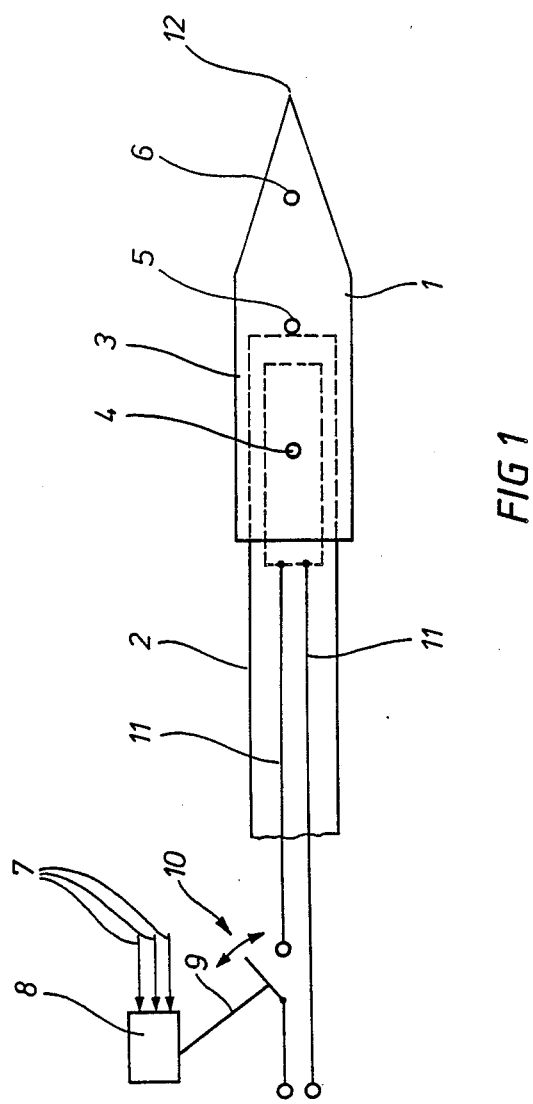
FIG. 1 is a schematic drawing of a soldering iron according to the invention.

There is shown schematically a soldering iron with its soldering tip body 1 and its tubular stem 2, a heating element 3 being embedded in the near end of the soldering tip body 1.

Several temperature sensors 4, 5, 6 are arranged distributed over the length of the soldering tip body 1 and placed on the axis thereof.

Their output signals are supplied via lines 7 to a computer 8, which evaluates the temperatures measured by the temperature sensors. The computer in turn is connected via a line 9 to a switch 10, which switches a heating line 11 to the heating element 3. The lines 7 extend also in the cable of the heating line 11.

The computer has had a program entered in it which permits inferring from the temperatures instantaneously measured by the temperature sensors 4, 5, 6 the important instantaneous temperature of the soldering tip 12. In accordance therewith it controls the switch 10, which switches the heating element 3 on or off accordingly.

The computer takes into account, besides experimentally obtained data, not only the measured temperatures but also the rates of variation of the temperatures, the distances between the temperature sensors and so forth.

Figure 2:
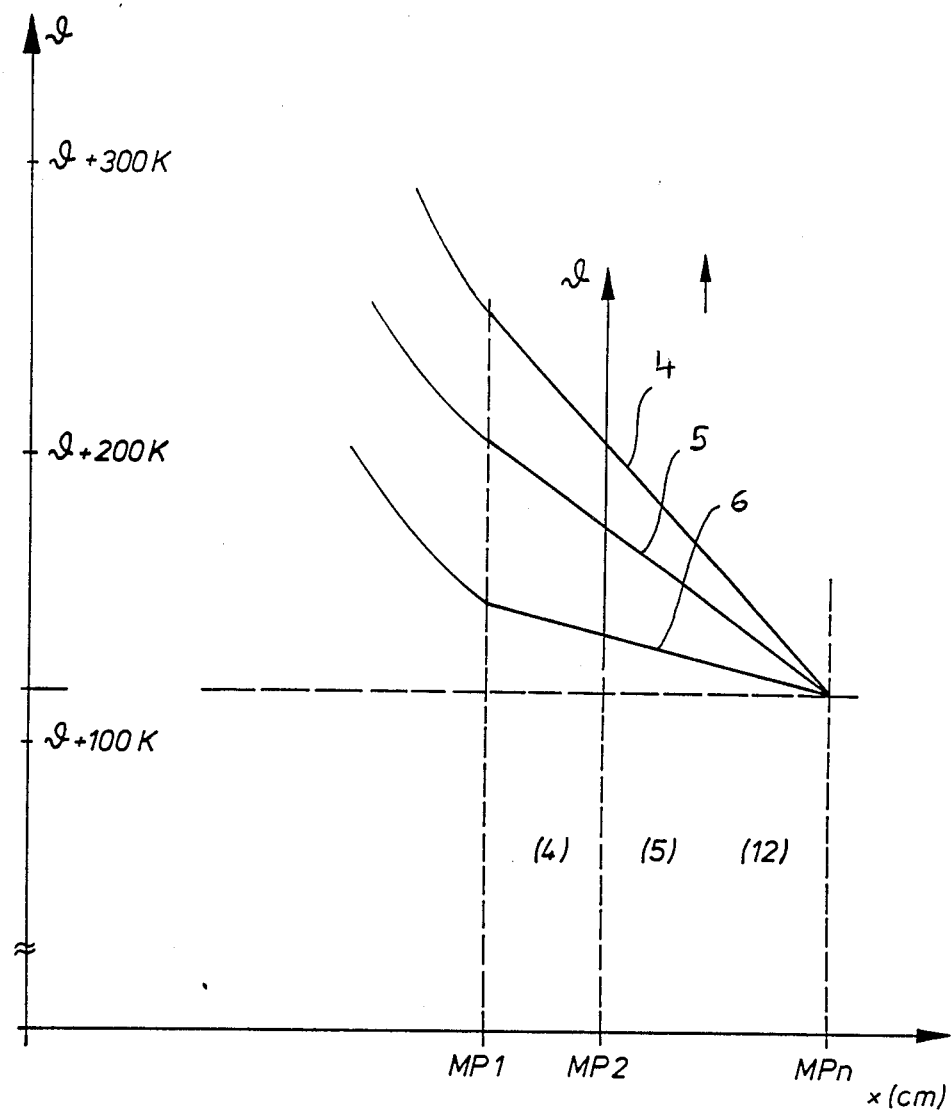
FIG. 2, a diagram of the temperature distribution over the soldering tip body with representation of various load states.

FIG. 2 shows a diagram of the temperature distribution along the soldering tip body 1 with marking of three temperature sensors 4, 5, 6 assumed by way of example. On the abscissa is plotted the distance in cm from—e.g.—the foot of the soldering tip body 1, and on the ordinate the temperature.

In the diagram itself, three different load states are plotted, it being seen that the heat flow 3 comes about when soldering a thin wire, the heat flow 2 when soldering a medium wire, and the heat flow 3 when soldering a thick wire. The heat transfer from the soldering tip varies accordingly.

Now according to the invention the control functions so that the soldering tip 12 is always maintained at the same temperature (desired value). This was not possible with controls known until now.

Figure 3:
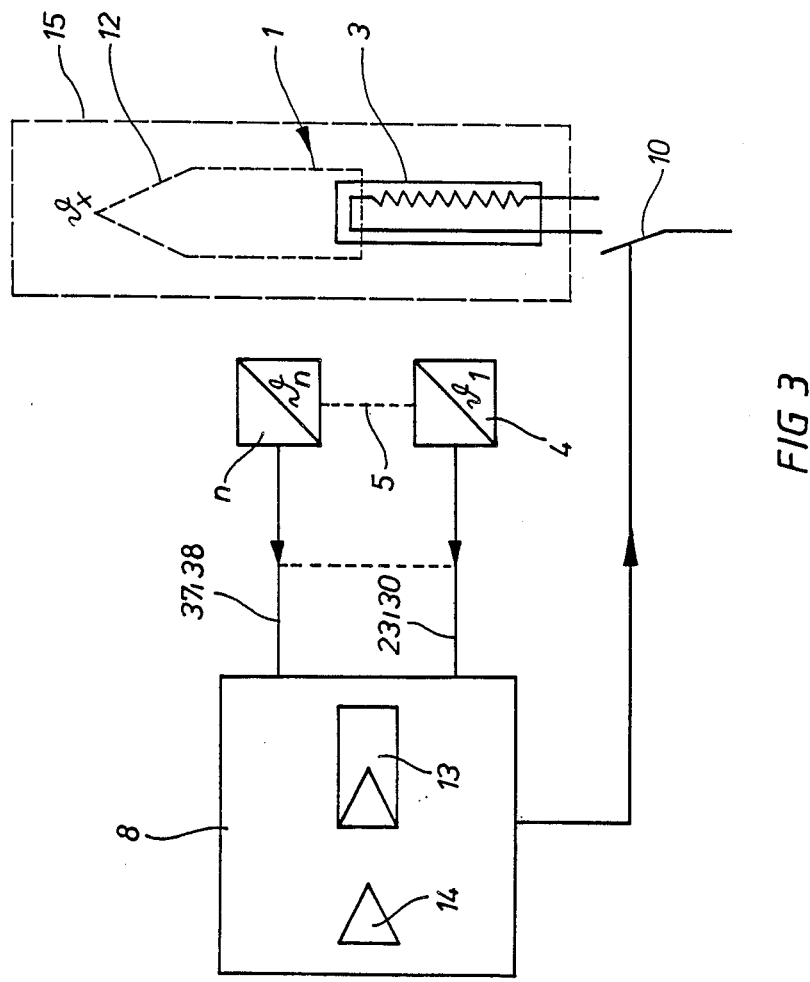
FIG. 3 shows schematically the design of the soldering tip body as a controlled system for the determination of the soldering tip temperature.

With controls known until now the temperature in the region of the heating element, e.g. at the site of the temperature sensor 4, was maintained constant, and this led, besides the distribution of the heat flows as a family of curves per FIG. 2, to a strong variation of the soldering tip temperature. According to the invention, this is now prevented by the control schematized in FIG. 3.

It is seen here that the soldering tip body 1 is conceived as a controlled system in its longitudinal extent and that along the controlled system a plurality of temperature sensors 4, 5 . . . n are arranged.

The signals of these temperature sensors 4, 5 . . . n are sent via the lines 23, 30; 37, 38 to the computer 8 which contains a controller 13, which via switch 10 always supplies to the heating element 3 just enough heat for the temperature at the soldering tip 12 to remain constant independently of the load (heat flow). To this end the computer 8 must contain inter alia an amplifier 14.

FIG. 4 shows a detailed block diagram.

From a transformer 17 a line 18 leads via a measuring resistor 19 and a power control element 25 to the heating element 3.

The heating element 3 is connected in turn via line 16 to the secondary winding of transformer 17. Temperature measurement in the vicinity of the soldering tip occurs via a temperature sensor 5 designed as a thermocouple, the signals of which are supplied over the lines 31, 32 via a terminal point 33 to a differential amplifier 34. The output of the differential amplifier 34 forms via line 37 an input of the ADC 24 of computer 8.

For terminal point compensation a measuring element 35 is provided in the input branch of a differential amplifier 36, the differential amplifier 36 forming via line 38 an additional input of the ADC 24.

It is from the signals of lines 37, 38 that the temperature signal in the vicinity of the soldering tip 12 is formed.

As a second measuring signal the temperature of the heating element 3 itself is included in the measurement.

To this end, the measuring resistor 19 has taps 20, 21, which are supplied to a differential amplifier 22, which via line 23 forms an additional input with the ADC 24.

To this end the current flow through the heating element 3 is measured, while the voltage measurement occurs via the taps 27, 28 tapping directly at the heating element 3, which taps are supplied to a differential amplifier 29 which forms via line 30 an input of the ADC 24.

From the signals of the lines 23 and 30, therefore, the effective temperature of the heating element 3 is calculated. The signals, picked up by the computer 8 and by the internal analog/digital converter 24 and transformed into digital values are processed in the computer via a mathematical model so that the output of the controlled system is represented by the line 47 which via an amplifier 48 operates on the gate of the power control element 25.

Different control modes can be associated with the controller programmed in the computer 8. Preferably a Proportional-Integral-Differential (PID) mode is associated with the controller.

The power control element 25 is connected to the input side of the heating element 3 via line 26.

So that the power control element 25 will switch always only in the zero crossing, a zero crossing recognition stage 40 is provided, which by a line 39 branches from line 16 and forms an additional input of computer 8.

Further the computer comprises a multiple digital display 41, a keyboard 42, and an electrically programmable memory 43.

Via a serial interface 44 it is possible also to switch in additional soldering stations to the computer 8 via a corresponding data bus. In addition, an acoustic indicator 45 and an optical display 46 are provided for the operation of the power control element 25.

By the described method and with a soldering station produced by the method it is now possible for the first time to maintain the temperature of the soldering tip always constant independently of the heat flow from the soldering tip. Thus the temperature is always readjusted to the load, different characteristics being possible for the control mode.

Instead of the determination of the resistance of the heating element via a current and voltage measurement, it is provided in a development of the invention to measure only the voltage at a fixed current value. In that case, using a comparator, a fixed current value is adjusted via which the voltage measurement is triggered. That is to say, by the signal of the comparator the start for the voltage measurement is given. This offers the advantage of reducing the cost of computation in the processor for determining the resistance of the heating element.

I claim:

1. Method of controlling the operating temperature of a soldering iron to a predetermined value with the aid of a temperature sensor arrangement contained in the soldering iron which, depending on the measured temperature, switches a heating element of the soldering iron on or off, the method comprising the steps of stabilizing the temperature at the soldering tip (12), independently of the heat flow emanating from the soldering tip (12); arranging along the longitudinal extent of the tip body a controlled system on which several temperature sensors (4,5,6) are spaced from each other and from the soldering tip (12); supplying values picked up by the temperature sensors (4,5,6), such as temperature, rate of temperature change, temperature rise, to a computer (8) programmed to determine the temperature of the soldering tip (12) and maintaining it constant independently of the heat flow.

2. Method according to claim 1, wherein power supplied to the heating element (3) by means of a power control element (25) is actuated by a controller having a PID mode.

3. Method according to claim 2, wherein the power control element (25) is a Triac which is switched in the zero crossing.

4. A soldering iron for controlling the soldering operating temperature to a predetermined value comprising a soldering tip body (1) forming a soldering tip (12); a heating element (3) on said soldering tip body (1); at least two temperature sensors (4,5,6) arranged on the longitudinal axis of the soldering tip body (1) spaced from each other and from said soldering tip (12); means, depending on the measured temperature, for switching said heating element (3) of the soldering iron on or off; means for stabilizing the temperature at the soldering tip (12), independently of the heat flow emanating from the soldering tip (12); a controlled system including said at least two temperature sensors (4,5,6) for supplying values picked up by the temperature sensors (4,5,6), such as temperature, rate of temperature change, temperature rise, to a computer (8) programmed to determine the temperature of the soldering tip (12); and means responsive to said controlled system for maintaining said soldering tip (12) constant independently of the heat flow.

5. Soldering iron according to claim 4, wherein along the soldering tip body (1) at least two temperature sensors (4, 6) are arranged on the longitudinal axis spaced from each other.

6. Soldering iron according to claim 5, wherein one temperature sensor (6) is arranged near the tip and is designed as a thermocouple.

7. Soldering iron according to claim 6, wherein another temperature sensor (4) is formed by the heating element (3) itself.

8. Soldering iron according to claim 5, wherein another temperature sensor (4) is formed by the heating element (3) itself.

9. Soldering iron according to claim 4, wherein one temperature sensor (6) is arranged near the tip and is designed as a thermocouple.

10. Soldering iron according to claim 9, wherein a other temperature sensor (4) is formed by the heating element (3) itself.

11. Soldering iron according to claim 4, wherein another other temperature sensor (4) is formed by the heating element (3) itself.

* * * * *